United States Patent [19]
Jurkowski et al.

[11] Patent Number: 5,141,183
[45] Date of Patent: Aug. 25, 1992

[54] APPARATUS AND METHOD FOR DETERMINING ONE OR MORE OPERATING CHARACTERISTICS OF A RAIL-MOUNTED VEHICLE

[75] Inventors: Keith O. Jurkowski, Waukesha; Joseph L. Neidinger, Delafield, both of Wis.

[73] Assignee: Electromotive Systems, Inc., Milwaukee, Wis.

[21] Appl. No.: 632,186

[22] Filed: Dec. 21, 1990

Related U.S. Application Data

[63] Continuation-in-part of Ser. No. 430,488, Nov. 1, 1989, abandoned.

[51] Int. Cl.⁵ .............................. B61L 3/22; G01B 7/14
[52] U.S. Cl. ............................ 246/167 M; 246/122 R; 324/207.24
[58] Field of Search ............................ 324/179, 207.24; 414/273, 750; 246/122 R, 167 M, 194, 196, 197; 191/22 DM

[56] References Cited

U.S. PATENT DOCUMENTS

| | | | |
|---|---|---|---|
| 2,576,424 | 11/1951 | Sunstein | 246/194 X |
| 3,085,646 | 4/1963 | Paufve | 246/167 M |
| 3,518,422 | 6/1970 | Doorley et al. | 246/167 M |
| 3,800,935 | 4/1974 | Montgomery | 198/572 |
| 4,168,770 | 9/1979 | Segar et al. | 191/49 X |
| 4,766,547 | 8/1988 | Modery et al. | 364/478 |
| 4,818,939 | 4/1989 | Takahashi et al. | 324/207.24 X |
| 4,892,980 | 1/1990 | Riley | 191/14 |
| 4,919,057 | 4/1990 | Riley | 104/295 |
| 4,924,164 | 5/1990 | Riley | 318/587 |
| 5,003,260 | 3/1991 | Auchterlonie | 324/207.24 X |

FOREIGN PATENT DOCUMENTS

| | | | |
|---|---|---|---|
| 2617943 | 10/1977 | Fed. Rep. of Germany | 246/122 R |
| 2598375 | 11/1987 | France | 246/167 M |
| 4521237 | 2/1967 | Japan | 324/179 |
| 1-320433 | 12/1989 | Japan | 324/207.24 |
| 574758 | 9/1977 | U.S.S.R. | 246/122 R |

*Primary Examiner*—Frank E. Werner
*Assistant Examiner*—Scott L. Lowe
*Attorney, Agent, or Firm*—Andrus, Sceales, Starke & Sawall

[57] ABSTRACT

An apparatus and method for determining one or more operating characteristics of a vehicle mounted to and movable on a rail. A magnetic strip is mounted to the rail, and is provided with alternating regions of flux and no-flux. The vehicle is provided with a magnetic sensor, which senses the alternating flux regions of the magnetic strip as the vehicle move on the rail and outputs a signal in response thereto. The signals output by the sensor are processed by a micro-controller, to determine the vehicle speed, location and/or displacement from a predetermined point. The system is advantageously employed in any number of applications, such as in factory automation systems, automated material storage and retrieval systems, overhead crane control systems or the like.

9 Claims, 3 Drawing Sheets

APPARATUS AND METHOD FOR DETERMINING ONE OR MORE OPERATING CHARACTERISTICS OF A RAIL-MOUNTED VEHICLE

CROSS-REFERENCE TO RELATED APPLICATIONS

This application is a continuation-in-part of application Ser. No. 07/430,488 filed Nov. 1, 1989, now abandoned.

BACKGROUND AND SUMMARY

This invention relates to a rail-mounted system utilizing a vehicle for carrying an article, such as in an overhead trolley system, and more particularly to an apparatus and method for determining one or more operating characteristics of the vehicle relative to the rail during operation.

Rail-mounted vehicle systems are employed in a number of applications, such as in automated material storage and retrieval systems, assembly line component handling systems, and automated assembly lines utilizing robots or the like. In any system utilizing a vehicle on a rail, it is normally important to be cognizant of one or more operating characteristics of the vehicle relative to the rail. For example, in a multiple vehicle system such as an assembly line component handling application or a factory automation application, it is desirable to maintain proper spacing between the vehicles and to closely control the velocity of the vehicle on the rail. As another example, in a material storage and retrieval system, it is important to know the location of the vehicle on the rail.

For maintaining proper vehicle spacing, one known system involves use of a chain or the like, and mounting each vehicle at spaced interval on the chain. While this type of arrangement guarantees proper spacing, it is a rigid system. For example, it is impossible to vary the speed of one of the vehicles without varying the speed of all vehicles.

Another known system utilizes a bar code and reader arrangement, in which a bar code is applied to the rail and a reader mounted on the vehicle. While this type of system allows more flexibility, it is disadvantageous in the dirt or other foreign material over the bar code prohibits proper reading by the reader. This results in poor operation.

The present invention is for use with one or more vehicles movably on a rail, such as an electrified trolley system. In such a system, the vehicle is typically mounted to the rail by means of one or more wheels, and an electric motor is mounted to the vehicle to drive one or more of the wheels. An electrification system is mounted to the rail, for supplying power along the length of the rail. The vehicle is provided with a pickup engagable with the electrification system, which supplies power to the electric motor for moving the vehicle along the length of the rail.

In accordance with the invention, stationary magnetic means is mounted to the rail, and the magnetic means is provided with alternating flux regions oriented non-parallel to the direction of movement of the vehicle on the rail. If desired, a no-flux region may be disposed between adjacent regions of alternating flux. Sensor means is mounted to and movable with the vehicle. The sensor means acts to sense the presence of absence of flux regions provided on the magnetic means, and outputs a signal in response thereto. Means responsive to the sensor output signals is provided for determining one or more operating characteristics of the vehicle relative to the rail. In a preferred embodiment, the magnetic means comprises an axially extending magnetic strip mounted to and extending along the rail, and the alternating flux regions are oriented substantially perpendicular to the direction of movement of the vehicle on the rail. The sensor means outputs an open circuit in response to detection of a magnetic field above a predetermined threshold, which occurs each time the sensor means passes over one of the magnetized regions on the magnetic strip. The means responsive to the sensor output signals preferably comprises a microprocessor, programmable controller or the like. This component of the system acts to count the number of output signals output by the sensor means, and this information is processed to determine the vehicle speed, the location of the vehicle on the rail, and/or the displacement of the vehicle from a predetermined point.

In one embodiment, power is supplied to the vehicle motor by means of one or more conductor bars mounted to the rail. Additionally, the conductor bars provide power to the vehicle controller, and ground potential to the vehicle motor. The magnetic strip is mounted to a conductor bar and the sensor means is assembled to a pickup or collector, which is preferably engagable with the conductor bar that is normally used to supply ground potential to the vehicle motor. In one desirable arrangement, the conductor bar is provided with an axial passage along its length, and the magnetic strip is physically placed within the axial passage, In this manner, the magnetic strip is concealed and is not subjected to wear, but its alternating regions of flux and no-flux are susceptible to detection through the conductor bar by the sensor provided on the pickup.

The invention also contemplates a method of determining one or move operating characteristics of a vehicle relative to a rail, substantially in accordance with the foregoing summary.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
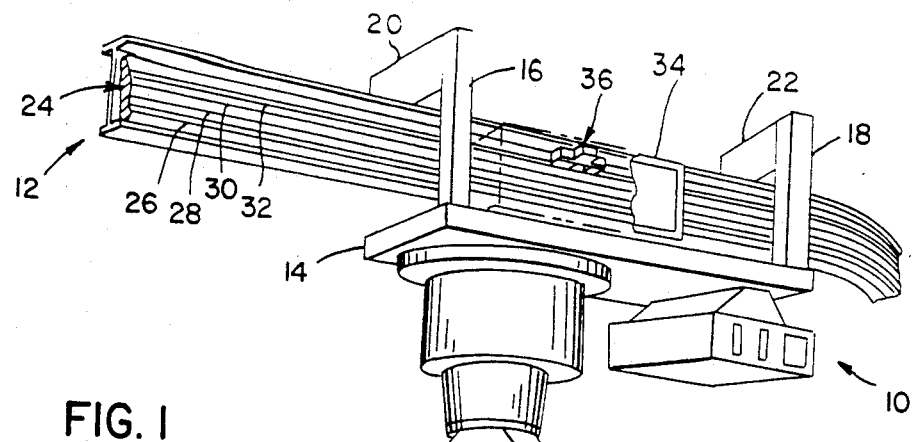
FIG. 1 is a partial perspective view showing a vehicle mounted to an electrified rail, with an automated robot carried by the vehicle.

FIG. 1 generally illustrates an overhead electrified trolley system in which a vehicle, shown generally at 10, is mounted to a rail, shown generally at 12. Vehicle 10 is shown carrying an industrial robot 13, the details of which are unimportant to the present invention While vehicle 10 and rail 12 are illustrated in a factory automation system, it is understood that vehicle 10 and rail 12 may be utilized in any satisfactory application involving movement of an article from one point to another in a predetermined path.

As is known, vehicle 10 generally includes a lower frame 14 having a pair of vertical support member 16, 18 extending upwardly therefrom. A pair of horizontal supports 20, 22 are connected to vertical supports 16, 18, respectively, and a pair of wheels (not shown) are connected one to each of horizontal supports 20, 22. The wheels ride on top of rail 12, for moving vehicle 10 on rail 12. As is also known, vehicle 10 includes an electric motor (not shown) which is operable to move the wheels on rail 12, for moving vehicle 10.

Between the flanges of rail 12 is provided a multi-conductor electrification system, shown generally at 24. Electrification system 24 includes a plurality of conductor bars, such as shown at 26, 28, 30 and 32. Conductor bars 26-32 supply power to the vehicle motor, control signals to the controller, as well as ground potential to the vehicle. This type of rail electrification system may illustratively be that such as sold by Electromotive Systems, Inc., of Milwaukee, Wisc. under its designation FABA 100.

A box 34 is mounted to vehicle 10, and includes a plurality of conductor bar contact of pickups, commonly referred to as collectors, which interface with conductor bars 26-32 for supplying electric power to the u vehicle electric motor from conductor bars 26-32. Box 34 includes a plurality of pickup members, such as shown at 36, which are wired to the electric motor for supplying power or ground potential thereto.

Figure 2:
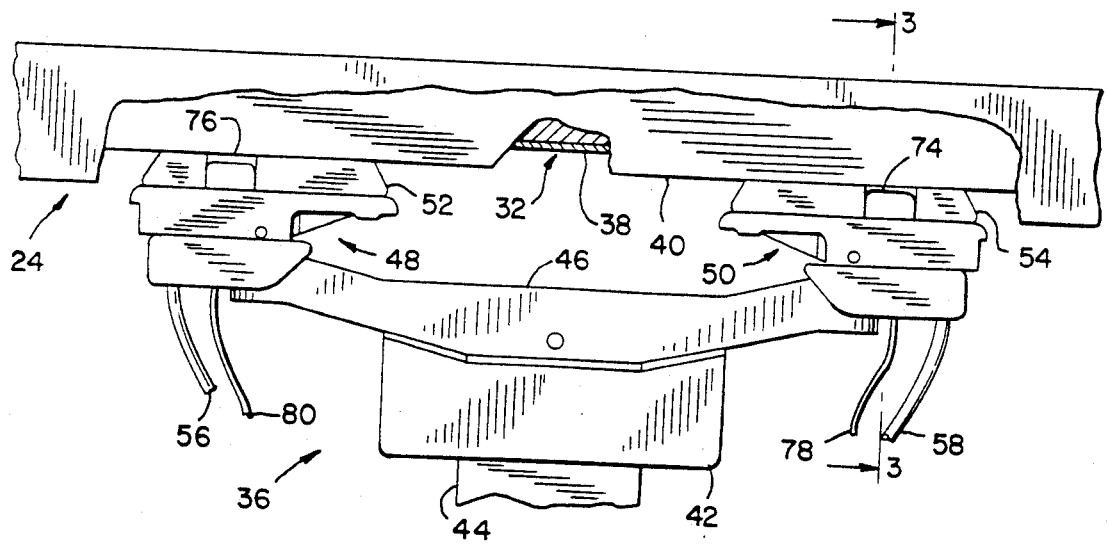
FIG. 2 is a partial top plan view of a portion of the apparatus of FIG. 1, showing a pickup for supplying power to the vehicle motor from the rail electrification system.

Referring now to FIG. 2, the interface of electrification system 24 and pickup 36 is shown in greater detail. As shown, conductor bar 32 includes an outwardly facing contact surface 38, which is housed within and protected by a plastic bar holder or hanger 40.

Pickup member 36 includes a bracket 42 through which pickup 36 is mounted to vehicle 10 by means of support member 44. An arm member 46 is connected to bracket 42. Each end of arm member 46 is provided with a pivotally mounted contact holder, shown at 48, 50. Contact holders 48, 50 include contacts 52, 54, respectively, mounted thereto. The outer contact surfaces of contacts 52, 54 are in engagement with contact surface 38 of conductor bar 32, for supplying electric power, control signals, and/or ground potential to the vehicle electric motor and its controller through wires 56, 58, respectively.

Figure 3:
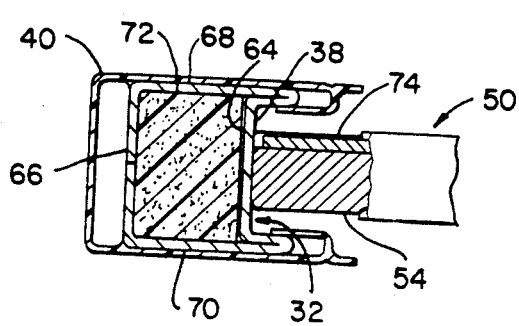
FIG. 3 is a partial sectional view taken generally along line 3—3 of FIG. 2.

Referring now to FIG. 3, it is seen that contact surface 38 is the outwardly facing surface of an outer wall 64, spaced inwardly from which is disposed an inner wall 66. While contact surface 38 is shown as a vertical outwardly facing surface, it is understood that the contact surface of bar 32 may also satisfactorily be any other inwardly or outwardly facing horizontal, vertical, or otherwise oriented surface of bar 32. A pair of side walls 68, 70 extend between outer wall 64 and inner wall 66, and define a box-shaped channel or passage in the interior of conductor bar 32. A magnetic strip 72, the details of which will later be explained, is placed within the channel or passage defined by walls 64-70 of conductor bar 32. It has been found that providing magnetic member 62 within a bar supplying ground potential has been particularly advantageous.

With further reference to FIG. 3, contact member 54 is fitted with a magnetic sensor, shown at 74. As shown in FIG. 2, contact member 52 is likewise provided with a sensor, shown at 76. Two sensors are employed so as to account for problems created by joints between sections of magnetic strips, or in case one or the other of sensors 74, 76 were for some reason rendered inoperative. It is understood, of course, that a single sensor could be employed, or that more than two sensors may be used. Sensors 74, 76 are connected to output wires 78, 80, respectively. Sensors 74, 76 may be that such as manufactured by Micro Switch, a division of Honeywell, under its part number SS21PE or SS22PE. Sensors 74, 76 are provided with a magnetoresistive material integrated on silicon and protected by an epoxy overcoat. Each sensor includes an integrated circuit providing a digital output in response to detection of a magnetic field.

Figure 4:
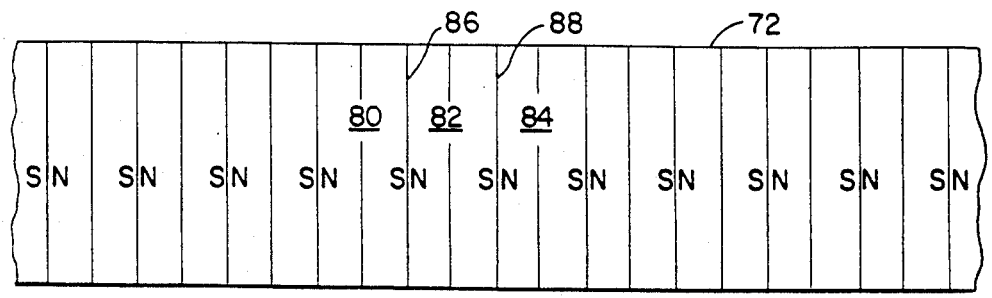
FIG. 4 is a schematic representation of the sensor and the alternating poles provided on the magnetic strip.

With reference to FIG. 4, it is seen that magnetic strip 72 is magnetized so as to provide alternating north and south poles providing alternating regions of flux. Magnetic strip 72 is preferably formed from a barium ferrite powder mixed with a synthetic rubber base, which is extruded to provide a suitable cross-section, such as the rectangular cross section as shown in FIG. 3. Magnetic strip 72 is then magnetized in a conventional manner to provide a permanent magnetic member having alternating flux regions.

For purposes of illustration, regions 80, 82 and 84 of strip 72 will be referred to. A precise line of demarcation is provided between regions 80, 82 and 84. A line 86 separates regions 80 and 82, and a line 88 separates regions 82 and 84. Lines 86, 88 are oriented substantially perpendicular to the direction of motion of vehicle 10 along rail 12. No-flux regions exist midway between the north and south pole provided on each of regions 80, 82 and 84.

In the illustrated embodiment, the alternating magnetic regions are of constant, equal lengths. In a prototype construction, strip 72 has been magnetized such that each magnetic region has a length of 0.125 inches.

It is also possible to vary the length of the magnetic member of regions, as long as a predetermined number of regions are provided for a given length of strip 72.

Another method is to provide a magnetized strip with north and/or south magnetized regions separated by no-flux regions.

Figure 6:
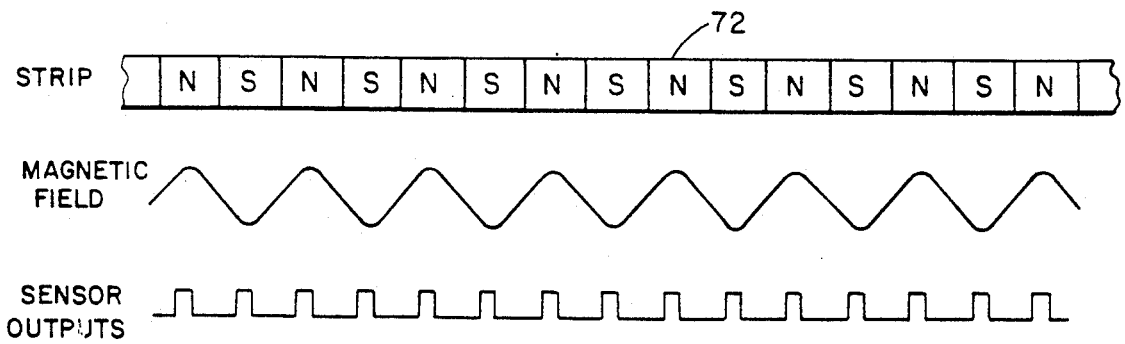
FIG. 6 is a schematic view showing the magnetic strip alongside graphic representations of the alternating magnetic fields provided on the strip, and of the sensor outputs.

Referring to FIG. 6, the alternately magnetized regions of magnetic strip 72 provide a sinusoided fluctuation in the strength of the magnetic field of strip 72 along the length direction of strip 72, as illustrated immediately below strip 72. As vehicle 10 moves along rail 12, sensors 74, 76 sense the presence of alternating flux regions on magnetic strip 72, and output an open or closed circuit in response to the presence or absence of a magnetized field. Sensors 74, 76 output either an open or closed circuit in response to the presence or absence of the magnetic field. As shown in the lower portion of FIG. 6, sensors 74, 76 output a closed circuit when the strength of the magnetic field, whether north or south, rises above a predetermined threshold. When the magnetic field falls below the threshold, sensors 74, 76 output an open circuit until the predetermined threshold is once again detected. In this manner, a closed circuit is repetitively output by sensors 74, 76 as sensors 74, 76 move along the length of strip 72 during movement of vehicle 10 along rail 12.

FIG. 6 illustrates the duration of the "on" condition of sensors 74, 76 as being longer than the duration of the "off" condition. The relationship of the duration of the "on" condition of sensors 74, 76 relative to the duration of the "off" condition can vary depending on the magnetic strength of strip 72, the sensitivity of sensors 74, 76 and electronic circuitry.

Figure 5:
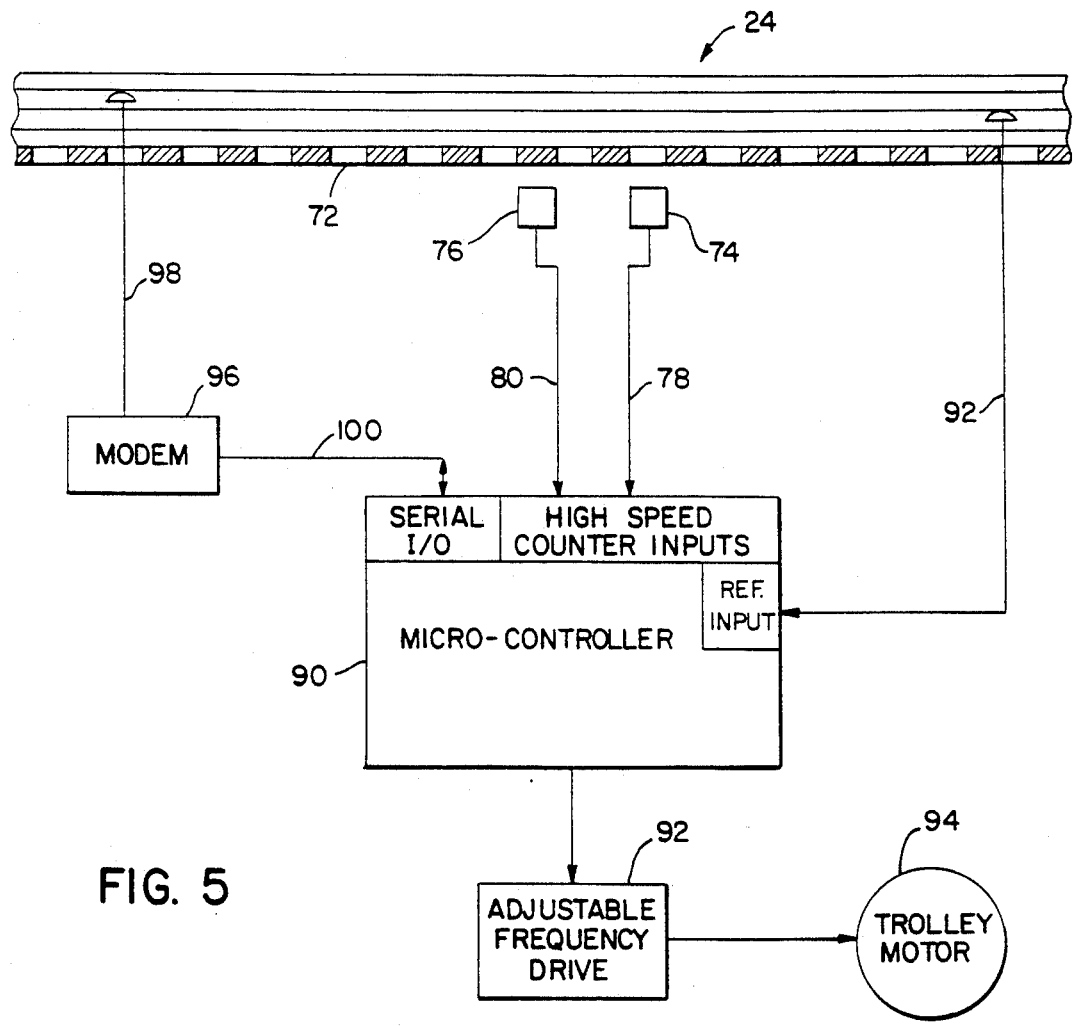
FIG. 5 is a schematic representation of a system responsive to the sensor for determining one or more operating characteristics o the vehicle relative to the rail.

FIG. 5 illustrates a control system for vehicle 10. Sensors 74, 76 are connected through wires 78, 80 to a micro-controller 90. Micro-controller 90 may be any satisfactory device, such as a microprocessor, programmable controller, or the like. Each of sensors 74, 76 provides an input signal to micro-controller 90. As noted above, the input signal is either in the form of an open circuit or a closed circuit, depending on the position of sensors 74, 76 relative to magnetic strip 72. Micro-controller 90 acts to count the number of open or closed circuits input by sensors 74, 76 and this information is employed to calculate the speed, location and/or displacement of vehicle 10 relative to rail 12.

Micro-controller 90 also receives an input signal from one of the conductor bars through a wire 92, which provides a reference input. The input signals from the conductor bars may be by means of frequency, voltage, amperage, or any combination thereof, as desired. For example, if a predetermined speed of vehicle 10 is desired, micro-controller 90 is programmed such that a predetermined reference signal input from the conductor rail to micro-controller 90 results in vehicle 10 travelling at the predetermined speed. Micro-controller 90 processes the input signals from sensors 74, 76 to determine the actual rate at which vehicle 10 is travelling, as well as the distance travelled. Through a satisfactory speed adjustment system, such as an adjustable frequency drive 92, micro-controller 90 acts to control the speed of the trolley motor, shown at 94, so as to achieve the desired predetermined speed according to the input reference signal.

The signals output by sensors 74, 76 may be processed by micro-controller 90 in accordance with known quadrature principles to also determine the direction of motion of vehicle 10 on rail 12.

A modem 96 or any other satisfactory communication device can be utilized to set the desired speed set point in micro-controller 90. Modem 96 may be wired to electrification system 24 through wiring shown at 98, and to micro-controller 90 through wiring shown at 100. Communication signals are sent over the conductor bars of electrification system 24 to modem 96, and transferred therethrough to micro-controller 90 for commands such as speed settings, distance settings, and/or destination settings, on the fly.

With the system of the invention, it is possible to constantly provide an indication of the speed, location and displacement of vehicle 10. In an automated system employing multiple vehicles, the speed of each vehicle can constantly be altered so as to maintain a predetermined spacing between vehicles. In a material storage and retrieval system, the precise location of each vehicle can constantly be monitored. These are but a few examples of numerous applications of the present system.

It is understood that a particular embodiment of the invention has been described with reference to a particular environment, but that various details, as well as the particular application of the invention, may be changed without departing from the spirit or scope of the invention. For example, the magnetized strip could be mounted to the rail in any satisfactory manner, such as by an adhesive or mechanical means. The magnetic strip may be affixed to any structural member, and need not necessarily be attached to the rail. Additionally, while language has been employed implying that rail 12 is horizontal and vehicle 10 is thus moved only horizontally, it is understood that rail 12 could be oriented vertically or on an incline, resulting in vertical movement of vehicle 10 or ascending or descending movement of vehicle 10.

Further, as noted previously, it is possible to vary the length of the alternating magnetic regions provided on strip 72, as long as a predetermined number of regions are provided for a given length of strip 72. Since micro-controller 90 simply acts to count the number of open or closed circuits input by sensors 74, 76, the location and displacement of vehicle 10 relative to rail 12 can be determined simply by the absolute number of open or closed circuits input by sensors 74, 76, as can the average speed of vehicle 10 or rail 12. To provide accurate discrete determinations of vehicle speed, however, it is advantageous to make the alternating flux of constant, equal lengths. This also facilitates the magnetization of strip 72 during it manufacture.

Various alternatives and embodiments are contemplated as being within the scope of the following claims particularly pointing out and distinctly claiming the subject matter regarded as the invention.

We claim:

1. A system for moving an article, comprising: a vehicle for carrying the article;
   rail means for supporting said vehicle and on which aid vehicle is movable;
   means for moving said vehicle on said rail means, comprising an electric motor mounted to said vehicle conductor bar means mounted to said rail means, and a pickup for transferring power from said conductor bar means to said electric motor and control signals and ground potential to the vehicle;
   a stationary permanent magnetic strip mounted to said conductor bar means, said strip having permanent regions of flux along its length separated by no-flux areas, the flux regions being oriented nonparallel to the direction of movement of said vehicle on said rails means;
   a sensor mounted to said pickup so as to be movable along with said vehicle, said sensor acting to sense the flux regions provided on said magnetic strip and to output a signal in response thereto; and
   means responsive to said sensor output signals for determining one or more operating characteristics of said vehicle relative to said rail means.

2. The system of claim 1, wherein said magnetic strip is magnetized so as to provide regions of alternating flux separated by a no-flux area.

3. The system of claim 2, wherein the alternating flux regions provided on said magnetic strip are oriented substantially perpendicular to the direction of movement of said vehicle on said rail means.

4. The system of claim 3, wherein the regions of alternating flux are of substantially constant equal length along the length of said magnetic strip.

5. The system of claim 1, wherein said conductor bar means comprises a conductor bar mounted to said rail means, and wherein said magnetic strip is mounted to said conductor bar and said sensor means is mounted to said pickup.

6. The system of claim 1, wherein said means responsive to said sensor receives output signals from said sensor and processes said output signals to determine one or more operating characteristics of said vehicle relative to said rail means.

7. The system of claim 6, wherein said means responsive to said sensor comprises controller means operatively disposed between said sensor and said electric motor for controlling the speed of operation of said vehicle on said rail means in response to the determination of said one or more operating characteristics.

8. For an article moving system including a vehicle having an electric motor, rail means for supporting the vehicle and on which the vehicle is movable, a conductor bar system mounted to said rail means, and a pickup arrangement for transferring power from said conductor bar system to said electric motor, an apparatus for determining one or more operating characteristics of the vehicle relative to the rail means, comprising:
 a stationary permanent magnetic member mounted to said conductor bar system, said magnetic member comprising a magnetizable strip being magnetized to provide permanent regions of flux being separated by no-flux areas, the flux regions being oriented non-parallel to the direction of movement of said vehicle on said rail means;
 sensor means mounted to and movable with said pickup arrangement, said sensor means acting to sense the flux regions provided on said magnetic strip and to output a signal in response thereto; and
 means responsive to said sensor means output signals for determining one or more operating characteristics of said vehicle relative to said rail means.

9. For an article moving system including a vehicle having an electric motor, rail means for supporting the vehicle and on which the vehicle is movable, a conductor bar system mounted to said rail means, and a pickup arrangement for transferring power from said conductor bar system to said electric motor, a method for determining one or more operating characteristics of the vehicle relative to the rail means, comprising the steps of:
 providing a permanently magnetizable member;
 permanently magnetizing said magnetizable member so as to provide permanent regions of flux along its length, the flux regions being separated by no-flux areas;
 mounting the magnetizable member to said conductor bar system;
 mounting a sensor to said pickup arrangement to sense the flux regions on said magnetizable member as said vehicle move on said rail means and to output a signal in response thereto;
whereby one or more operating characteristics of said vehicle relative to said rail means can be determined from the signals output by the sensor.

* * * * *